(12) United States Patent
Chavez

(10) Patent No.: US 8,488,720 B1
(45) Date of Patent: Jul. 16, 2013

(54) SYSTEM AND METHOD FOR ADAPTIVE POLAR QUANTIZATION

(75) Inventor: Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 358 days.

(21) Appl. No.: 12/877,155

(22) Filed: Sep. 8, 2010

(51) Int. Cl.
*H03D 3/00* (2006.01)

(52) U.S. Cl.
USPC ........... 375/322; 375/244; 375/245; 375/286; 375/287

(58) Field of Classification Search
USPC .......................... 375/322, 244, 245, 286, 287
See application file for complete search history.

(56) References Cited

U.S. PATENT DOCUMENTS

| | | | | |
|---|---|---|---|---|
| 4,811,363 A | * | 3/1989 | Hoffmann | 375/329 |
| 4,843,616 A | * | 6/1989 | Hoffmann | 375/327 |
| 7,313,373 B1 | * | 12/2007 | Laskharian et al. | 455/127.1 |
| 2008/0019453 A1 | * | 1/2008 | Zhao et al. | 375/260 |

* cited by examiner

*Primary Examiner* — Siu Lee
(74) *Attorney, Agent, or Firm* — Donna P. Suchy; Daniel M. Barbieri

(57) ABSTRACT

Methods and systems for signal quantization may include, but are not limited to: receiving a complex signal characterized by a real portion and an imaginary portion; computing a vector magnitude of a sample of the complex signal; comparing the vector magnitude of the sample to a quantization threshold value; and associating a quantized magnitude with the sample according to a comparison between the vector magnitude of the sample and the quantization threshold value.

15 Claims, 14 Drawing Sheets

SYSTEM AND METHOD FOR ADAPTIVE POLAR QUANTIZATION

BACKGROUND

Signal processing efficiency is a critical aspect of realizing small, light-weight, and low-power communication systems. One of the most computationally expensive functions that a communication system may perform is correlation (often associated with signal acquisition). As such, it may be desirable to provide systems and methods for reducing the computational expenses associated with correlation processing, and the like.

SUMMARY

A systems and methods for adaptive polar quantization may include, but is not limited to: receiving a complex signal characterized by a real portion and an imaginary portion; computing a vector magnitude of a sample of the complex signal; comparing the vector magnitude of the sample to a quantization threshold value; and associating a quantized magnitude with the sample according to a comparison between the vector magnitude of the sample and the quantization threshold value.

BRIEF DESCRIPTION OF THE DRAWINGS

The disclosure will become more fully understood from the following detailed description, taken in conjunction with the accompanying drawings, wherein like reference numerals refer to like elements, in which Figure Reference No:

1 illustrates a process flow diagram for adaptive polar quantization.

Figure 1:
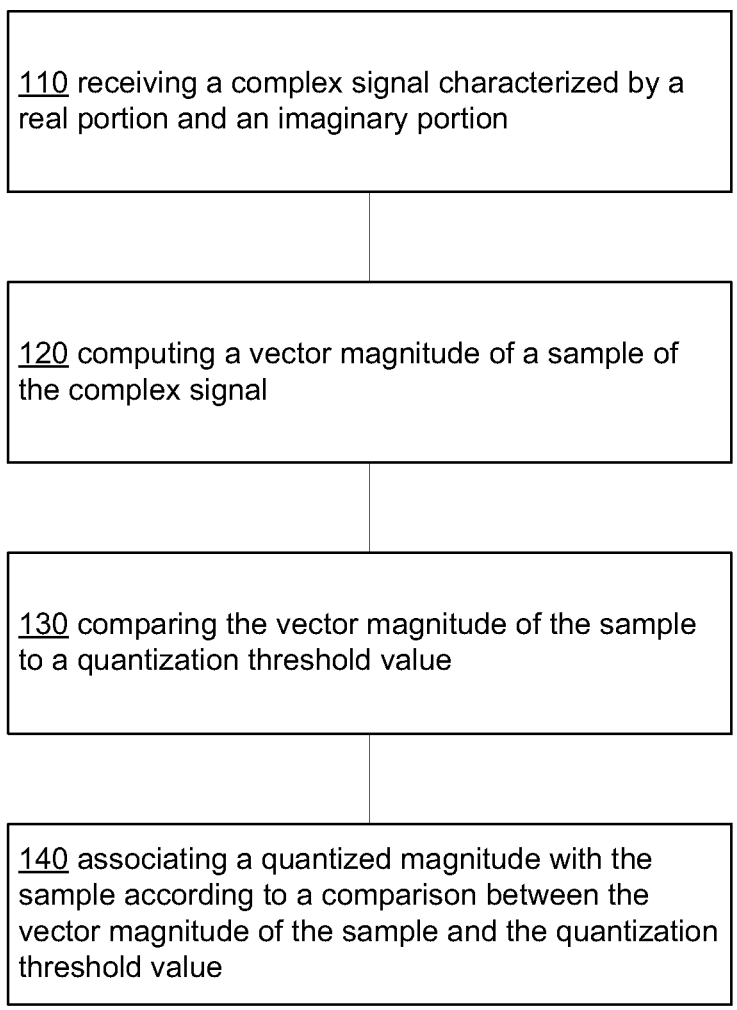

2 illustrates a process flow diagram for adaptive polar quantization.

3 illustrates a process flow diagram for adaptive polar quantization.

4 illustrates a process flow diagram for adaptive polar quantization.

5 illustrates a process flow diagram for adaptive polar quantization.

6 illustrates a process flow diagram for adaptive polar quantization.

7 illustrates a process flow diagram for adaptive polar quantization.

8 illustrates a process flow diagram for adaptive polar quantization.

9 illustrates a system for adaptive polar quantization;

10 illustrates a graphical representation of signal threshold comparisons;

11 illustrates a graphical representation of signal threshold comparisons;

12 illustrates a graphical representation of signal threshold comparisons;

13 illustrates a system for adaptive polar quantization;

14 illustrates a system for adaptive polar quantization.

DETAILED DESCRIPTION

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may not be limited to the particular embodiments depicted in the exemplary diagrams, but should be construed in accordance with the language in the claims.

Signal processing efficiency is a critical aspect of realizing small, light-weight, and low-power communication systems. One of the most computationally expensive functions that a communication system may perform is correlation (often associated with signal acquisition). Signal processing cost may be greatly reduced by quantizing a high-resolution input signal (e.g. a signal characterized by a large number of bits, such as a 12-bit signal) to a small number of bits prior to correlation (or other signal processing functions).

Figure 9:
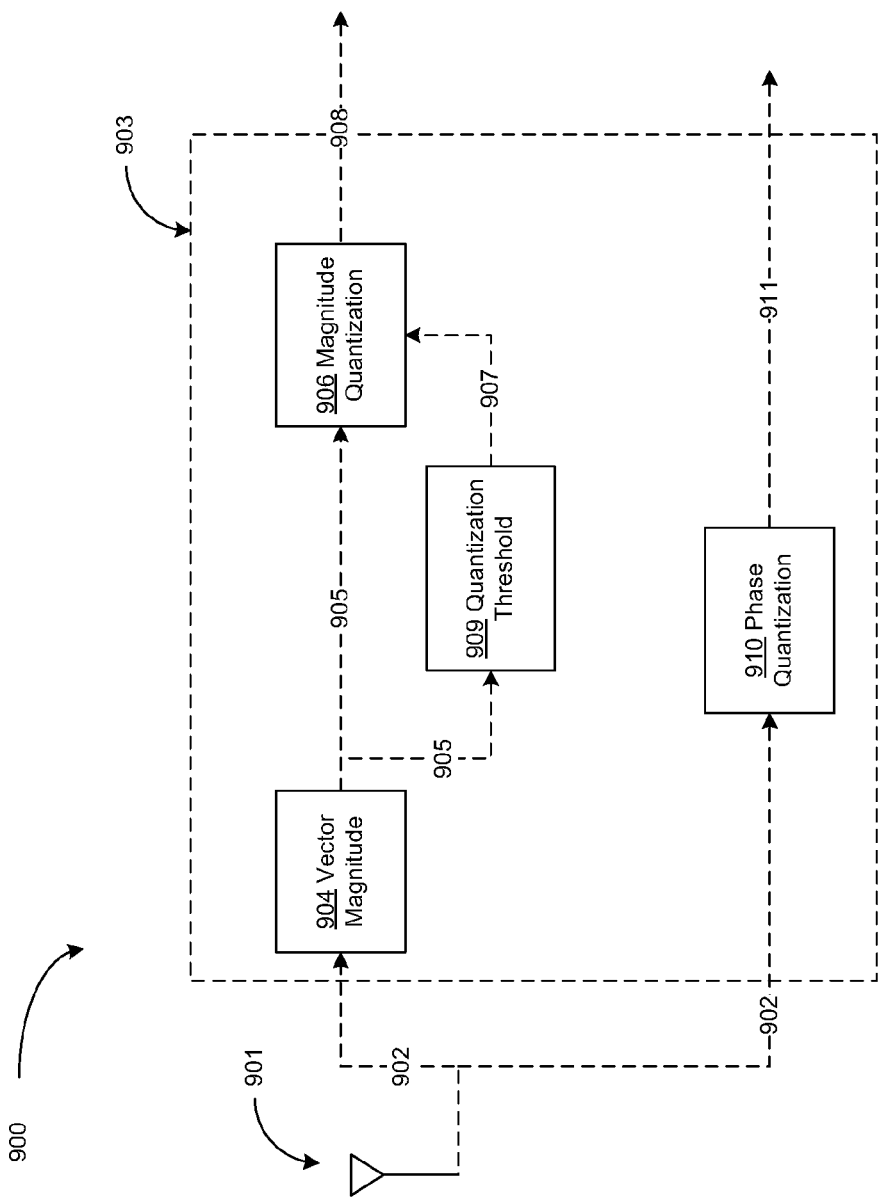

Referring to FIG. 9, an adaptive polar quantization system 100 is depicted.

Figure 13:
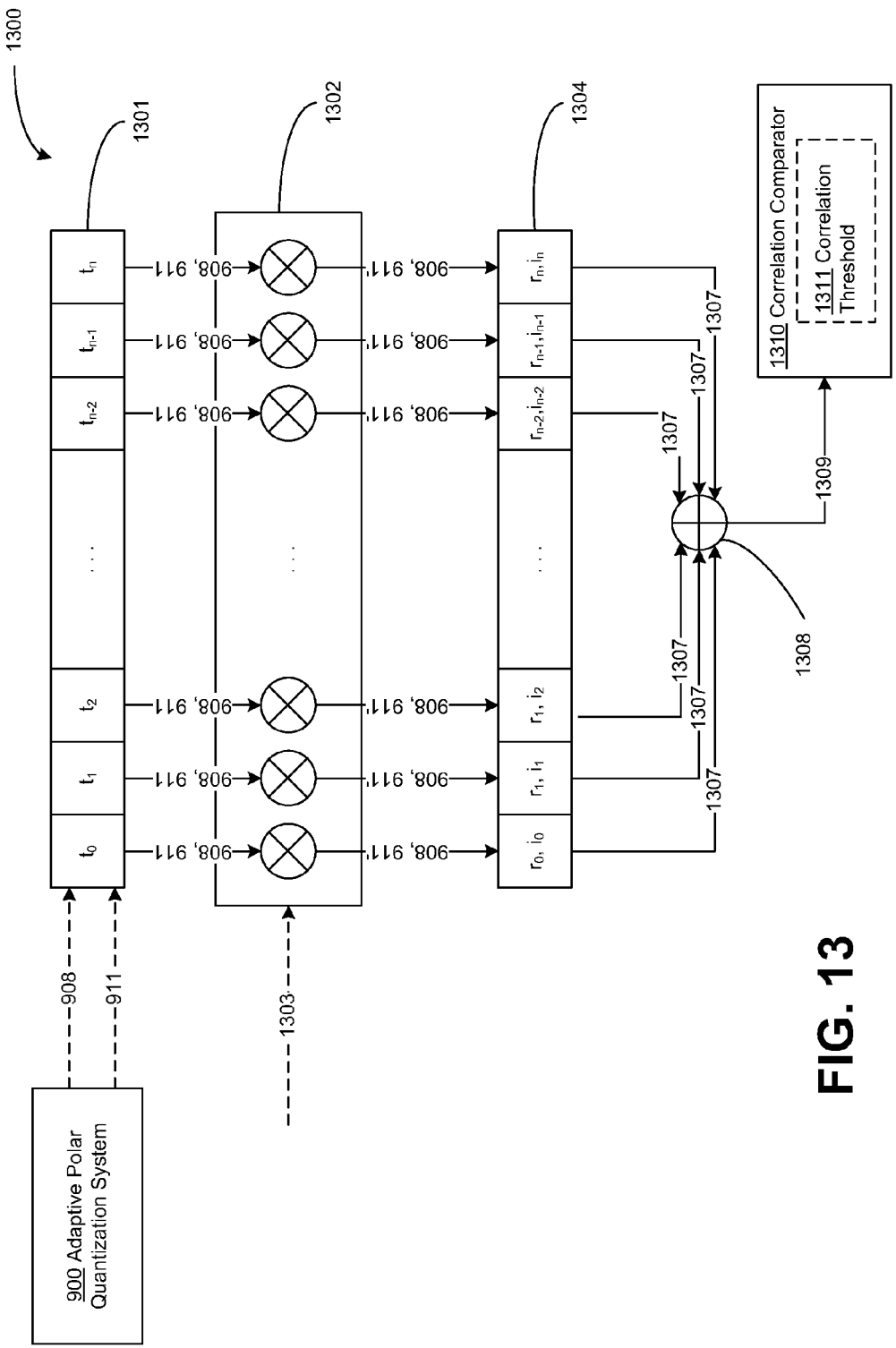

FIG. 1 illustrates an operational flow 100 representing example operations related to adaptive polar quantization. In FIG. 1 and in following figures that include various examples of operational flows, discussion and explanation may be provided with respect to the high-level block diagram of an adaptive polar quantization system 900 as shown in FIG. 9, and a signal correlation system 1300 incorporating the adaptive polar quantization system 900 as shown in FIG. 13, and/or with respect to other examples and contexts. However, it should be understood that the operational flows may be executed in a number of other environments and contexts, and/or in modified versions of FIGS. 9 and 13. Also, although the various operational flows are presented in the sequence(s) illustrated, it should be understood that the various operations may be performed in other orders than those which are illustrated, or may be performed concurrently.

As shown in FIG. 1, operational flow 100 may include one or more operations for carrying out adaptive polar quantization. For example, operational flow 100 may include operations 110, 120, 130, and/or 140.

Operation 110 illustrates receiving a complex signal characterized by a real portion and an imaginary portion. For example, as shown in FIG. 9, the adaptive polar quantization system 900 may include a receiving element 901 (e.g. an antenna and receiver, a network port, etc). The receiving element 901 may be configured to receive at least one complex signal 902 (e.g. one or more signals including both real and imaginary components). The complex signal 902 may be received from any number of sources including, but not limited to a radio frequency source. The complex signal 902 may be a high-resolution signal (e.g. a 12-bit signal). The complex signal 902 may be provided to an adaptive polar quantization module 903 for processing.

Operation 120 illustrates computing a vector magnitude of a sample of the complex signal. For example, as shown in FIG. 9, a vector magnitude module 904 may receive the high-resolution complex signal 902 and extract a sample of that complex signal 902 (e.g. sampling an output of an analog-to-digital converter) at a time $t_i$. A vector magnitude 905 of that sample may be computed according to:

$$\text{vector\_magnitude}_{t_i} = \sqrt{\text{sample}_{t_i,real}^2 + \text{sample}_{t_i,imag}^2} \quad \text{(Eqn. 1)}$$

where $\text{sample}_{real}$ is the real component of the complex signal 902 and $\text{sample}_{imag}$ is the imaginary component of the complex signal 902.

Operation 130 illustrates comparing the vector magnitude of the sample to a quantization threshold value. For example, as shown in FIG. 9, a magnitude quantization module 906 may receive the vector magnitude 905. The magnitude quantization module 906 may then compare the vector magnitude 905 to a quantization threshold value 907. The quantization threshold value 907 may be a user-defined value or may be dynamically determined by the adaptive polar quantization system 900, as will be described further below. A determination may be made by the magnitude quantization module 906 whether the vector magnitude 905 is greater than or less than the quantization threshold value 907 and a quantized magnitude 908 may be determined according to the determination.

Operation 140 illustrates associating a quantized magnitude with the sample according to a comparison between the vector magnitude of the sample and the quantization threshold value. For example, as shown in FIG. 9, the magnitude quantization module 906 may associate a particular quantized magnitude 908 with the vector magnitude 905 according to the comparison between the vector magnitude 905 and the quantization threshold value 907. For example, in a simplified 1-bit quantization case, if the vector magnitude 905 is greater than or equal to the quantization threshold value 907, a quantized magnitude 908 associated with the vector magnitude 905 may be assigned a value of "1." If the vector magnitude 905 is less than the quantization threshold value 907, a quantized magnitude 908 associated with the vector magnitude 905 may be assigned a value of "0." In such a manner, a high-resolution complex signal 902 (e.g. a 12-bit complex signal) may be quantized to a 1-bit low-resolution representation to reduce computational expenses associated with downstream processing of the complex signal 902. It will be noted that other multi-bit quantizations are contemplated so as to provide varying levels of processing enhancement and will be discussed further below.

Figure 2:
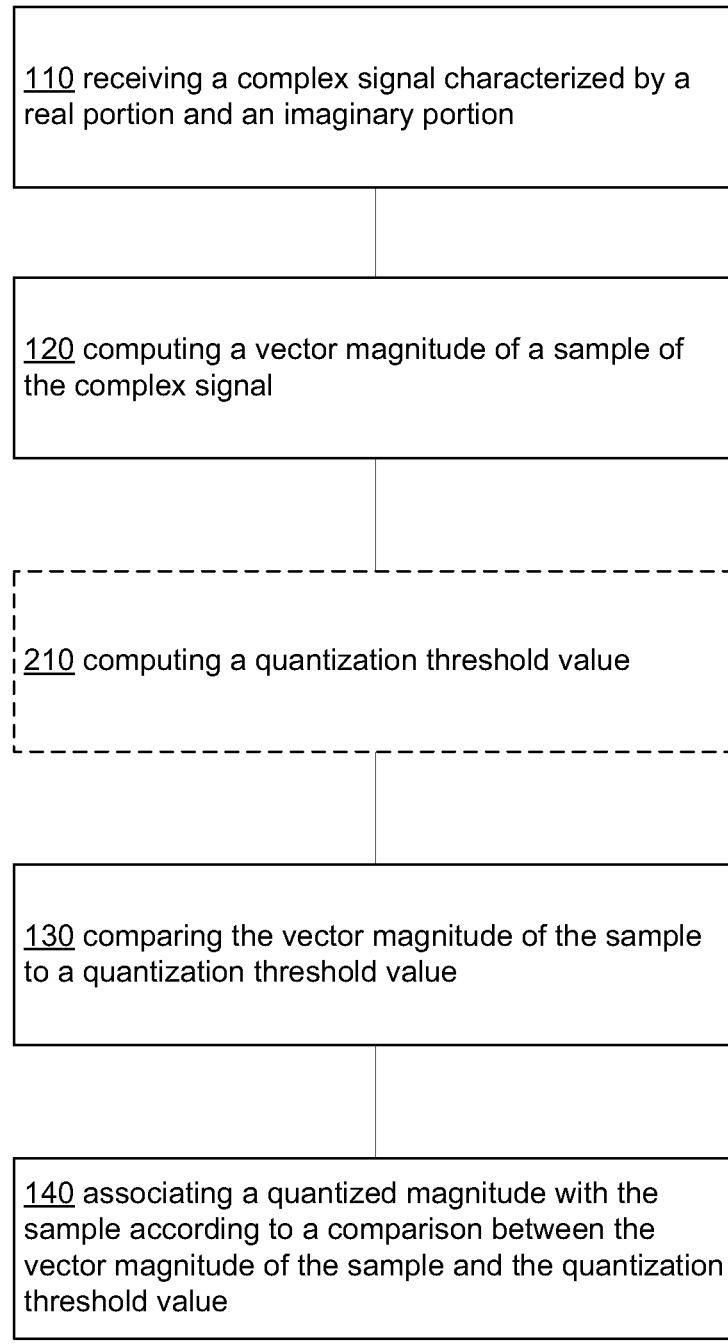

FIG. 2 illustrates alternative embodiments of the example operational flow 100 of FIG. 1. FIG. 2 illustrates example embodiments where the operational flow 100 of FIG. 1 may include at least one additional operation. Additional operations may include an operation 210.

Operation 210 illustrates computing a quantization threshold value. For example, as shown in FIG. 9, a quantization threshold module 909 may receive one or more vector magnitude 905 samples from the vector magnitude module 904. The quantization threshold module 909 may conduct a statistical analysis of the one or more vector magnitude 905 samples to compute the quantization threshold value 907. The computed quantization threshold value 907 may be provided to the magnitude quantization module 906 to allow for the association of a quantized magnitude 908 with the vector magnitude 905 as described above.

Figure 3:
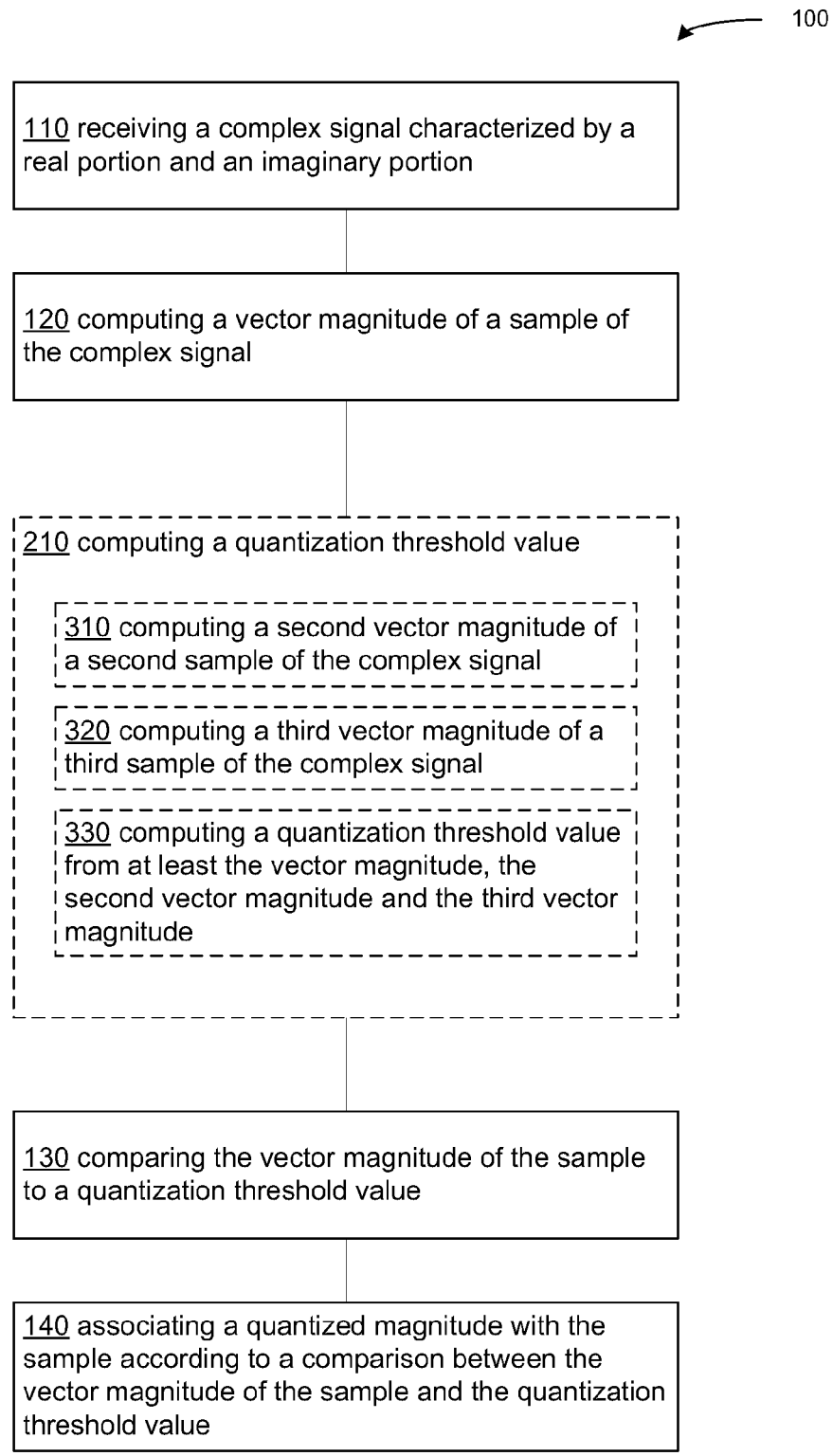

FIG. 3 illustrates alternative embodiments of the example operational flow 100 of FIG. 2. FIG. 3 illustrates example embodiments where the operation 210 of FIG. 2 may include at least one additional operation. Additional operations may include an operation 310, and/or an operation 320, and/or an operation 330.

Operation 310 illustrates computing a second vector magnitude of a second sample of the complex signal. For example, as shown in FIG. 9, the vector magnitude module 904 may receive the complex signal 902 and extract a second sample of that complex signal 902 (e.g. a sample taken at a previous point in time $t_{i-1}$ with respect to a time for a first sample, $t_i$, as described above). A second vector magnitude 905 associated with the second sample may be computed according to:

$$\text{vector\_magnitude}_{t_{i-1}} = \sqrt{\text{sample}_{t_{i-1},real}^2 + \text{sample}_{t_{i-1},imag}^2} \quad \text{(Eqn. 1)}$$

where $\text{sample}_{real}$ is the real component of the complex signal 902 and $\text{sample}_{imag}$ is the imaginary component of the complex signal 902.

Operation 320 illustrates computing a third vector magnitude of a third sample of the complex signal. For example, as shown in FIG. 9, the vector magnitude module 904 may receive the complex signal 902 and extract a third sample of that complex signal 902 (e.g. a sample taken at a subsequent point in time $t_{n+1}$ with respect to a time for a first sample, $t_n$, as described above). A third vector magnitude 905 associated with the third sample may be computed according to:

$$\text{vector\_magnitude}_{t_{i+1}} = \sqrt{\text{sample}_{t_{i+1},real}^2 + \text{sample}_{t_{i+1},imag}^2} \quad \text{(Eqn. 1)}$$

where $\text{sample}_{real}$ is the real component of the complex signal 902 and $\text{sample}_{imag}$ is the imaginary component of the complex signal 902.

Operation 330 illustrates computing a quantization threshold value from at least the vector magnitude, the second vector magnitude and the third vector magnitude. For example, as shown in FIG. 9, the first vector magnitude 905, the second vector magnitude 905 and the third vector magnitude 905 may be received by the quantization threshold module 909 from the vector magnitude module 904. The quantization threshold module 909 may conduct a statistical analysis of the first vector magnitude 905, the second vector magnitude 905 and the third vector magnitude 905 to compute the quantization threshold value 907.

Figure 4:
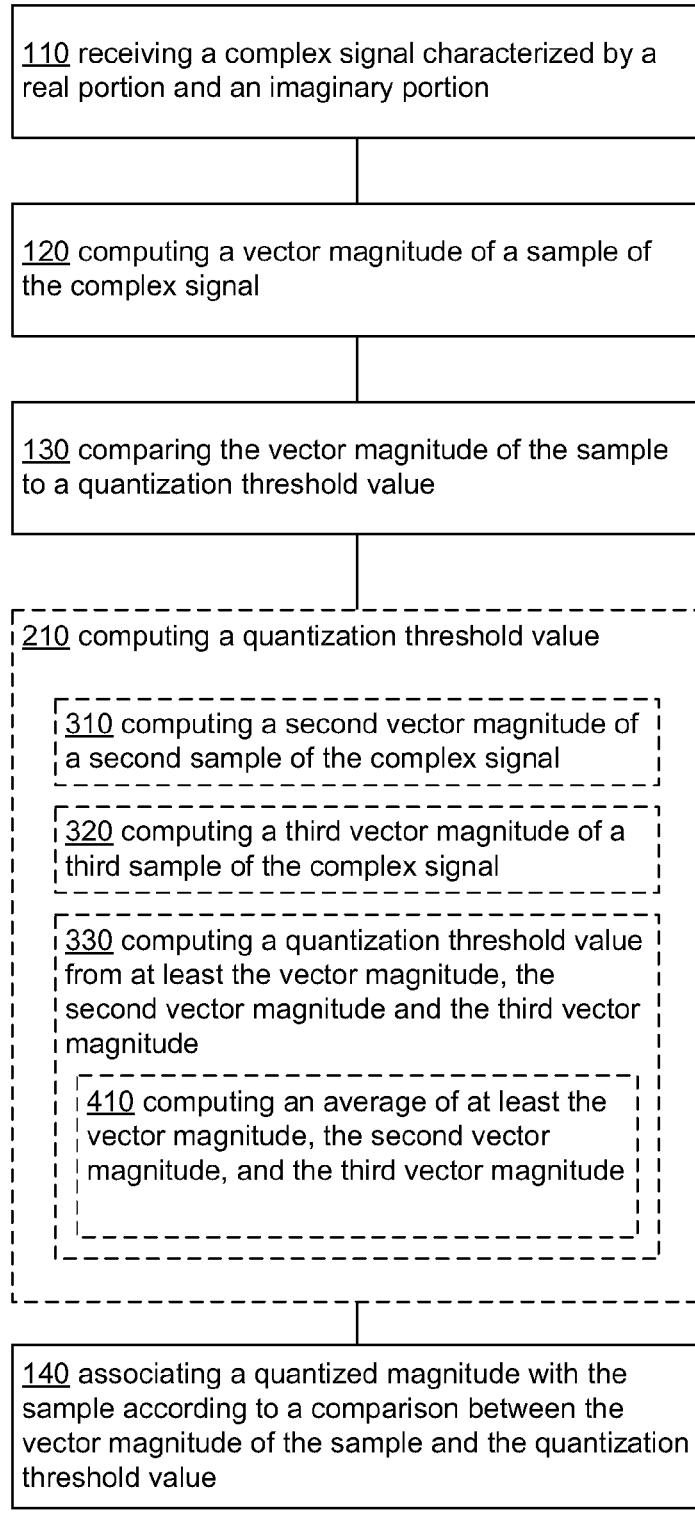

FIG. 4 illustrates alternative embodiments of the example operational flow 100 of FIG. 3. FIG. 4 illustrates example embodiments where the operation 330 of FIG. 3 may include at least one additional operation. Additional operations may include an operation 410.

Figure 10:
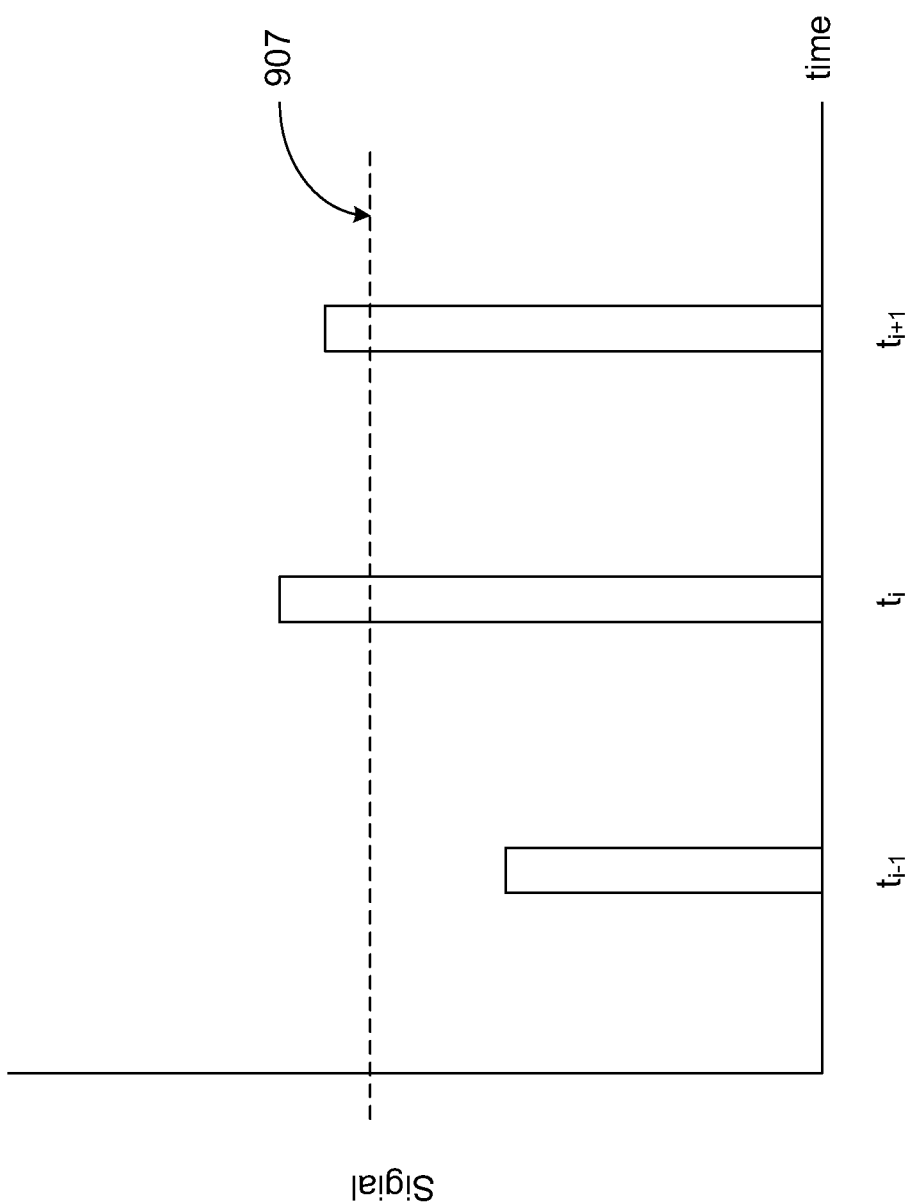

Operation 410 illustrates computing an average of at least the vector magnitude, the second vector magnitude, and the third vector magnitude. For example, as shown in FIG. 9, the quantization threshold module 909 may receive the first vector magnitude 905, the second vector magnitude 905 and the third vector magnitude 905 from the vector magnitude module 904. The quantization threshold module 909 may conduct a statistical analysis of the first vector magnitude 905, the second vector magnitude 905 and the third vector magnitude 905 to compute the quantization threshold value 907. For example, as shown in FIG. 10, the quantization threshold value 907 may be a simple average of the first vector magnitude 905 (e.g. at time $t_i$), the second vector magnitude 905 (e.g. at time $t_{i-1}$) and the third vector magnitude 905 (e.g. at time $t_{i+1}$) to yield the quantization threshold value 907 associated with the vector magnitude 905 obtained at time $t_n$ may be:

$$\text{quantization\_threshold}_{t_i} = \frac{\text{vector\_magnitude}_{t_{i-1}} + \text{vector\_magnitude}_{t_i} + \text{vector\_magnitude}_{t_{i+1}}}{3}$$

Figure 5:
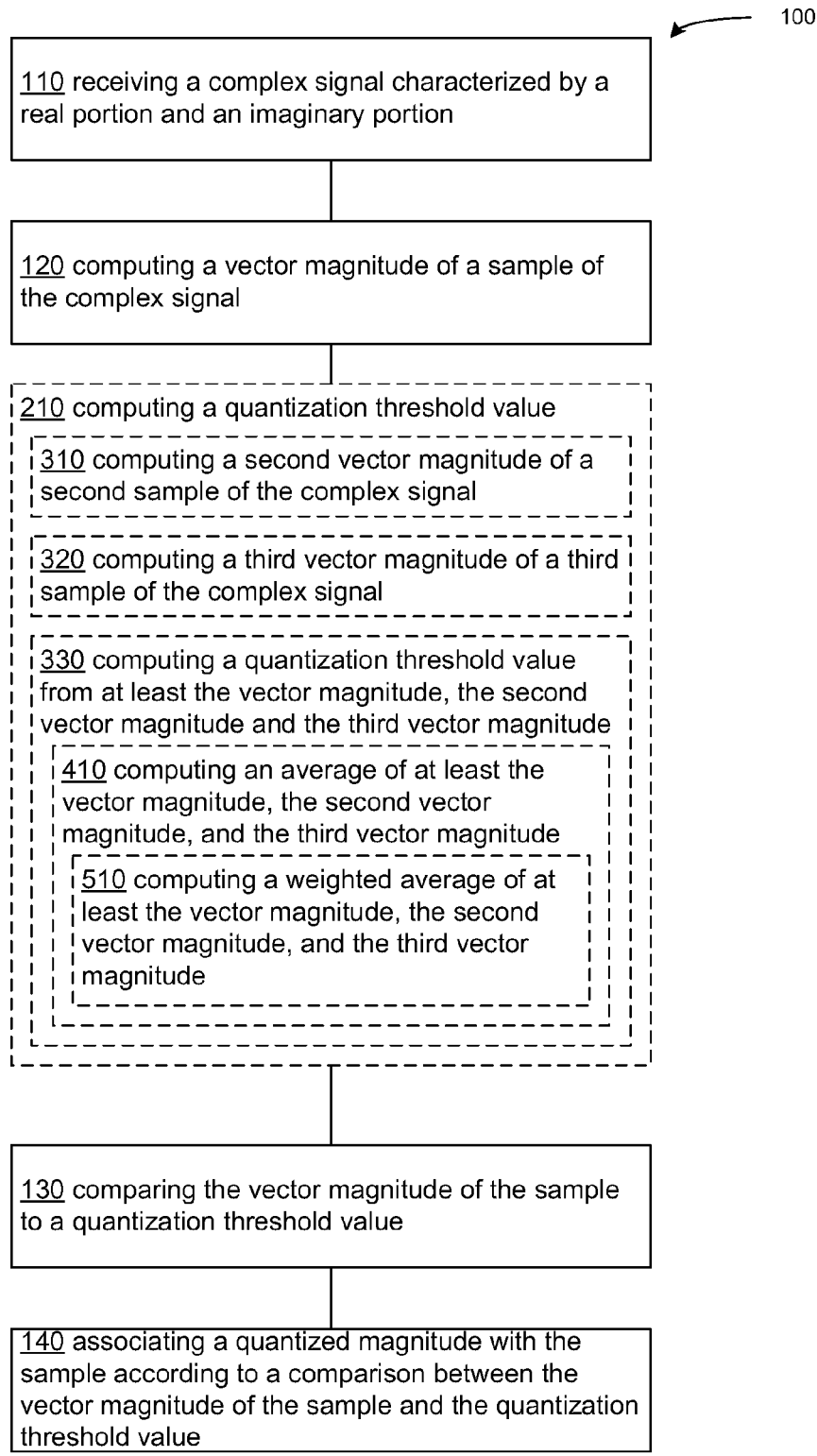

FIG. 5 illustrates alternative embodiments of the example operational flow 100 of FIG. 4. FIG. 5 illustrates example embodiments where the operation 410 of FIG. 4 may include at least one additional operation. Additional operations may include an operation 510.

Figure 11:
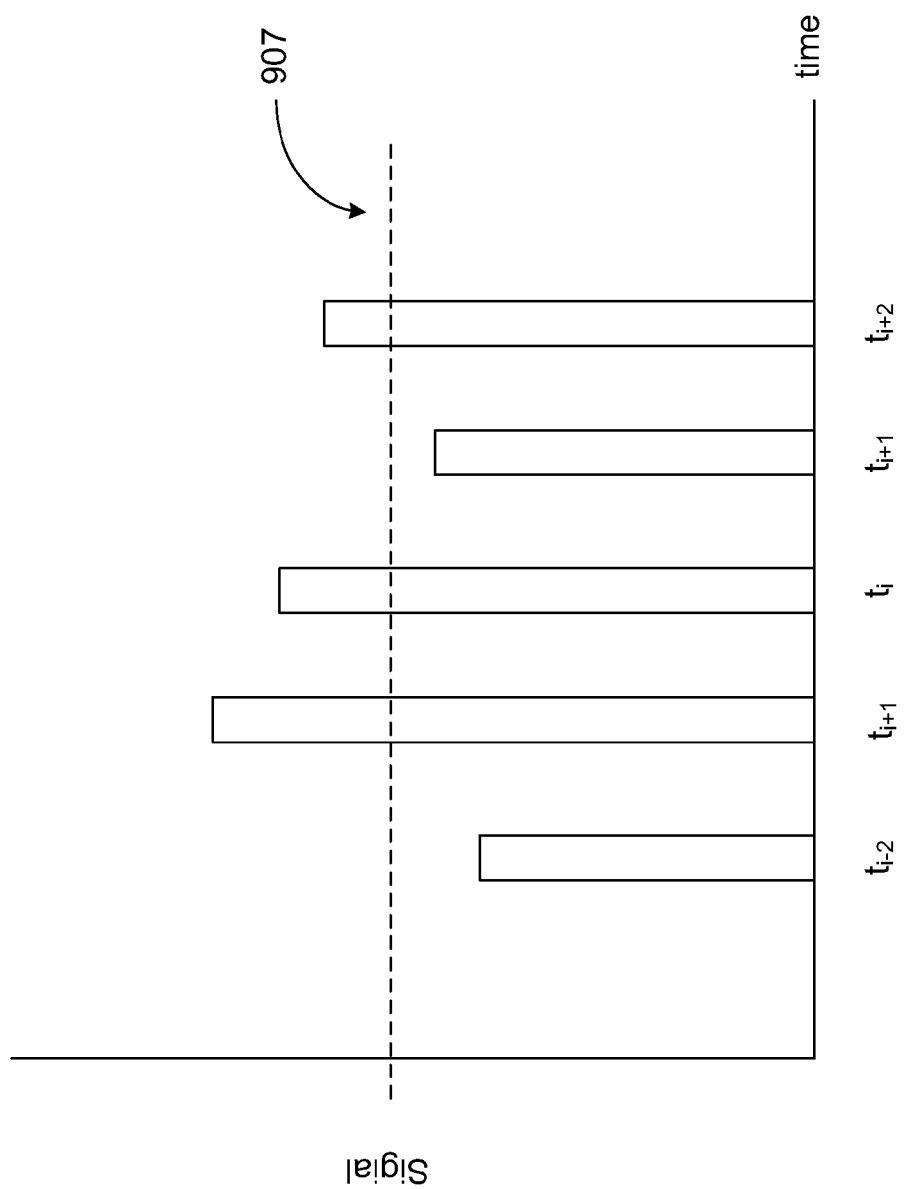

Operation 510 illustrates computing a weighted average of at least the vector magnitude, the second vector magnitude, and the third vector magnitude. For example, as shown in FIG. 9, the quantization threshold module 909 may receive the first vector magnitude 905, and one or more additional vector magnitude 905 values from the vector magnitude module 904. The quantization threshold module 909 may conduct a statistical analysis of the first vector magnitude 905 and the one or more additional vector magnitude 905 values. As shown in FIG. 11, a weighted average of the first vector magnitude 905 (e.g. at time $t_i$) and various other vector magnitudes may be computed. For example, less emphasis may be placed on vector magnitude 905 samples taken at times distant (e.g. at times $t_{i+2}$ and $t_{i-2}$) from a vector magnitude 905 currently subject to quantization (e.g. the first vector magnitude 905 sampled at time $t_i$) In such a case, such a vector magnitude 905 may be multiplied by a first coefficient "a." Further, more emphasis may be placed on vector magnitude 905 samples taken at times more proximate (e.g. at times $t_{i+2}$ and $t_{i-2}$) to a vector magnitude 905 currently subject to quantization (e.g. the first vector magnitude 905 sampled at time $t_i$). In such a case, such a vector magnitude 905 may be multiplied by a second coefficient "b." A resulting equation may be as follows:

$$\text{quantization\_threshold}_i = \frac{a \times (\text{vector\_magnitude}_{i-2} + \text{vector\_magnitude}_{i+2}) + b \times (\text{vector\_magnitude}_{i-1} + \text{vector\_magnitude}_{i+2}) + c \times \text{vector\_magnitude}_i}{2a + 2b + c}$$

Figure 6:
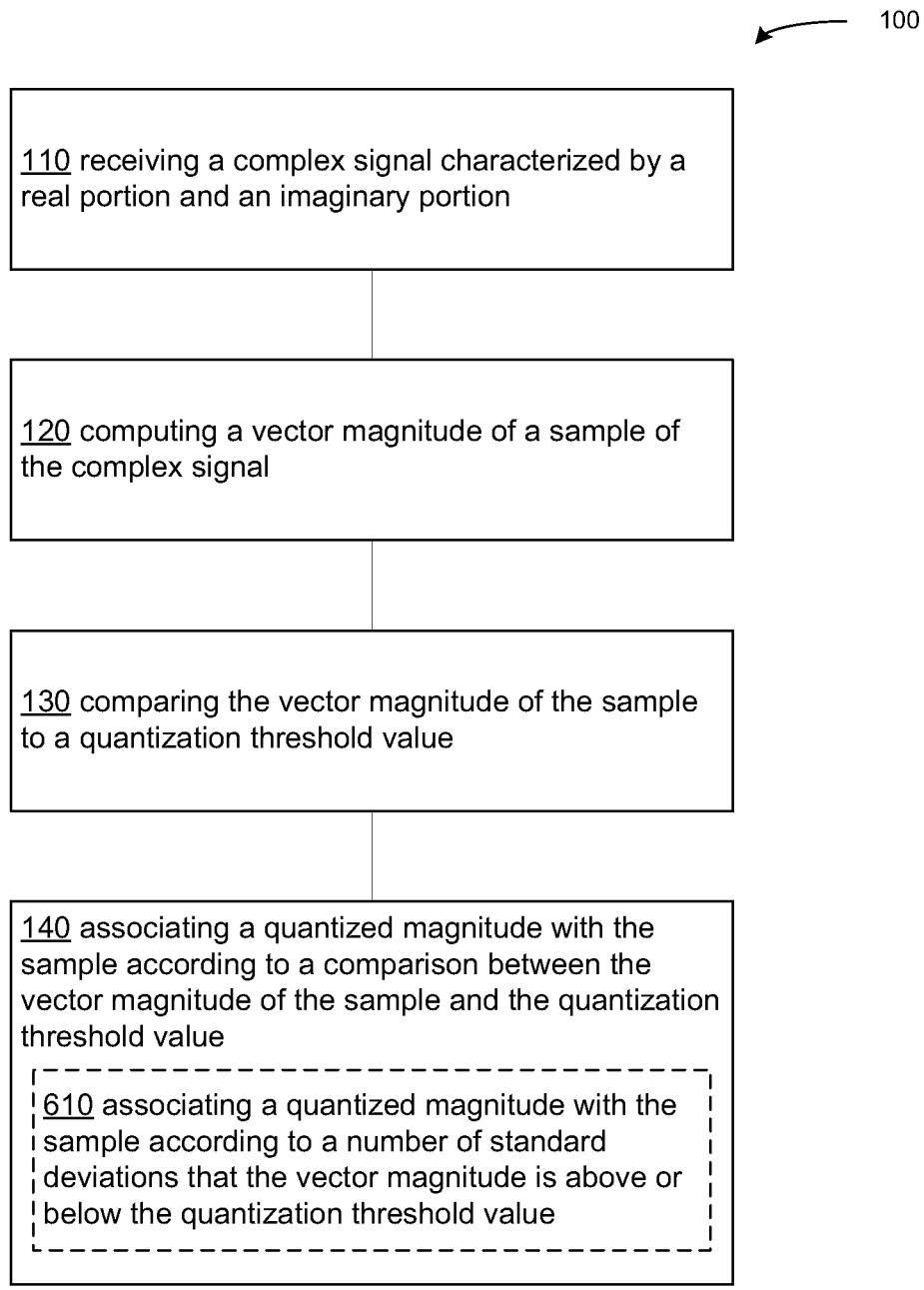

FIG. 6 illustrates alternative embodiments of the example operational flow 100 of FIG. 1. FIG. 6 illustrates example embodiments where the operation 140 of FIG. 1 may include at least one additional operation. Additional operations may include an operation 610.

Figure 12:
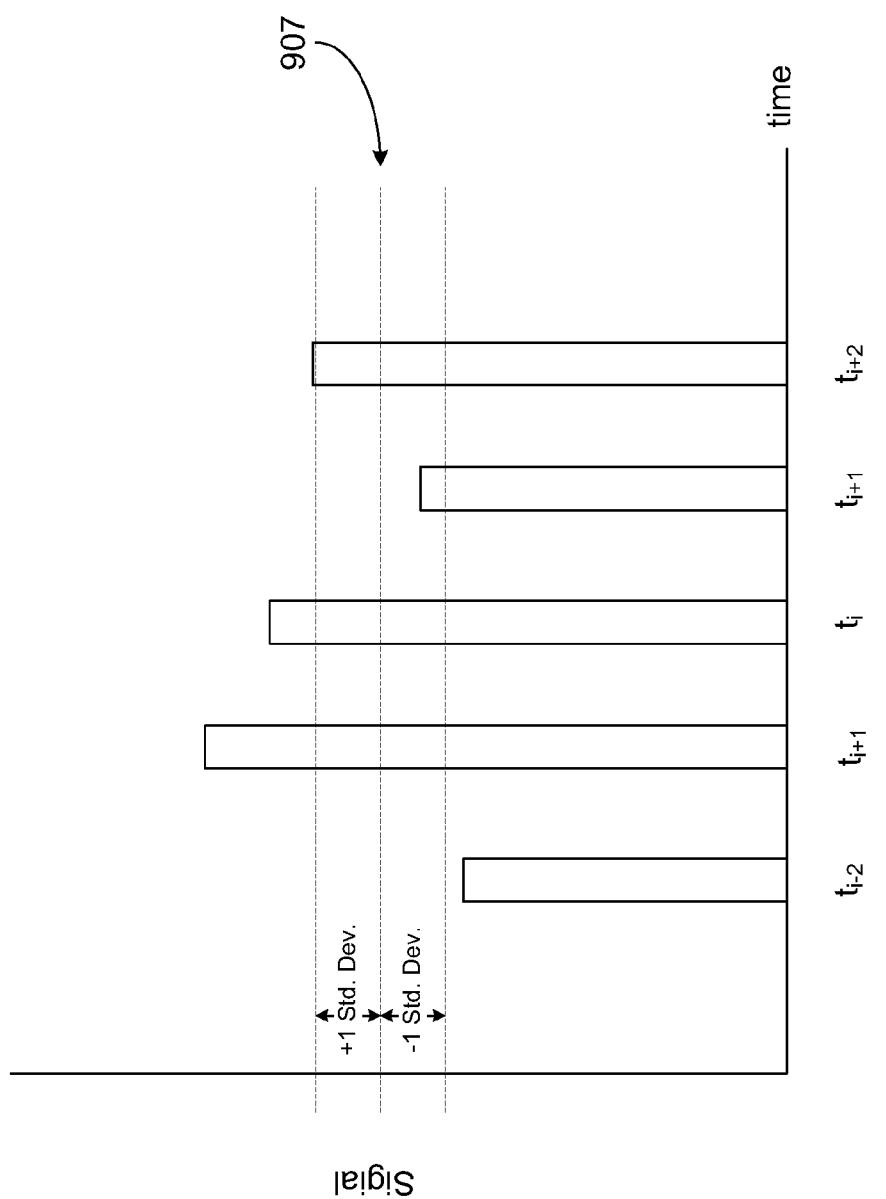

Operation 610 illustrates associating a quantized magnitude with the sample according to a number of standard deviations that the vector magnitude is above or below the quantization threshold value. For example, as shown in FIG. 12, a statistical distribution of vector magnitude 905 values over a given time period (e.g. from $t_{i-2}$ to $t_{i+2}$) may result in a quantization threshold value 907 as depicted in FIG. 12 through the operations described above. From this distribution, one or more standard deviation values may be computed. The relation of a vector magnitude 905 subject to quantization (e.g. at time $t_i$) to those standard deviation ranges may be used to associate a quantized magnitude 908 with that vector magnitude 905. For example, as shown in FIG. 12, in the case of a 2-bit quantization scheme, where the vector magnitude 905 at time $t_i$ is more than +1 standard deviation from the quantization threshold value 907, the vector magnitude 905 may be assigned a quantized magnitude 908 of "11." Further, where the vector magnitude 905 at time $t_i$ is between the quantization threshold value 907 and +1 standard deviation (not shown), the vector magnitude 905 may be assigned a quantized magnitude 908 of "10." Still further, where the vector magnitude 905 at time $t_i$ is between the quantization threshold value 907 and −1 standard deviation (not shown), the vector magnitude 905 may be assigned a quantized magnitude 908 of "01." Still further, where the vector magnitude 905 at time $t_i$ is more than −1 standard deviation from the quantization threshold value 907, the vector magnitude 905 may be assigned a quantized magnitude 908 of "00." It will be recognized that such a quantization scheme may be extended to any number of bits such that a reduction in computing expense may be realized with respect to the input high-resolution complex signal.

Figure 7:
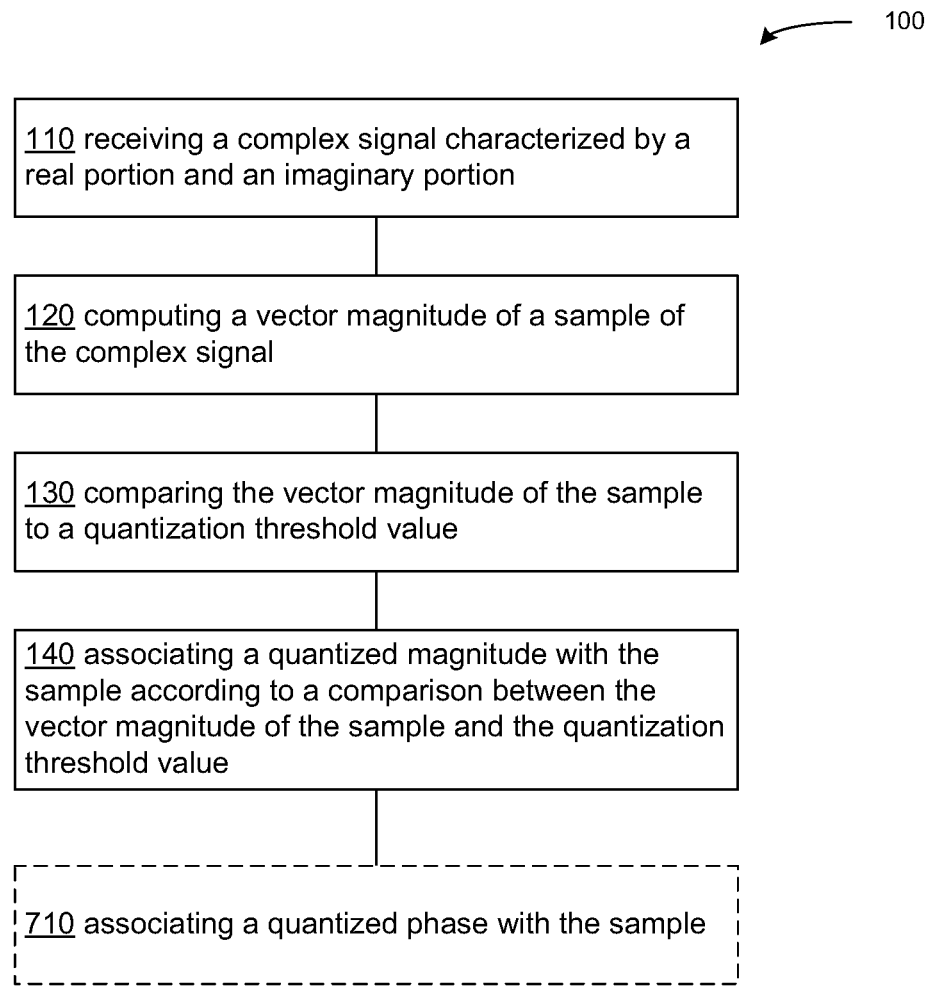

FIG. 7 illustrates alternative embodiments of the example operational flow 100 of FIG. 1. FIG. 7 illustrates example embodiments where the operational flow 100 of FIG. 1 may include at least one additional operation. Additional operations may include an operations 710.

Operation 710 illustrates associating a quantized phase with the sample. For example, as shown in FIG. 9, a phase quantization module 910 may receive the high-resolution complex signal 902 and extract a sample of that complex signal 902 (e.g. sampling an output of an analog-to-digital converter) at a time $t_i$. A quantized phase 911 of that sample may be computed by using the signs of the real and imaginary parts to determine which quadrant the phase lies in (2 bit phase quantization). Alternately, within a quadrant, the magnitudes of the real and imaginary parts may be compared to determine which octant the phase lies in (3 bit phase quantization). A look-up table may used to achieve more resolution within an octant.

In an exemplary implementation, the adaptive polar quantization system 900 may be incorporated into a signal correlation system 1300. The signal correlation system 1300 may utilize the quantized magnitude 908 and the quantized phase 911_generated by the adaptive polar quantization system 900 to perform signal correlation (e.g. as in signal acquisition processing) at a reduced computational expense as compared to signal correlation performed on the high-resolution complex signal 902.

Figure 8:
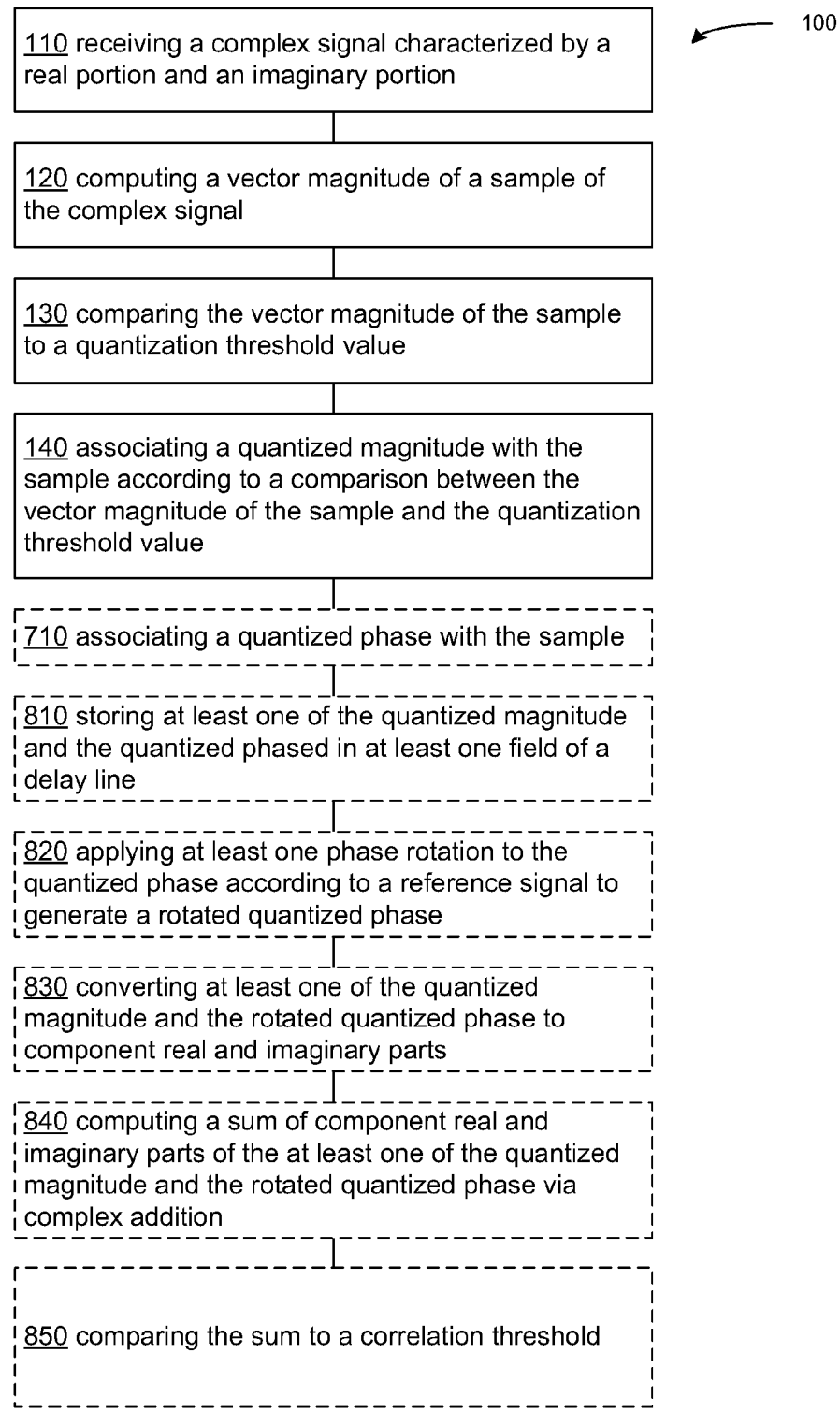

FIG. 8 illustrates alternative embodiments of the example operational flow 100 of FIG. 7. FIG. 8 illustrates example embodiments where the operational flow 100 of FIG. 7 may include at least one additional operation. Additional operations may include an operations 810, and/or an operation 820, and/or an operation 830, and/or an operation 840, and/or an operation 850.

Operation 810 illustrates storing at least one of the quantized magnitude and the quantized phased in at least one field of a delay line. For example, as shown in FIG. 13, one or more quantized magnitude 908 samples and the quantized phase 911 samples may be stored in a delay line 1301 or shift register over a period of time (e.g. from time $t_0$ to time $t_n$). The quantized complex signals 1307 may be stored in a first-in-first-out manner.

Operation 820 illustrates applying at least one phase rotation to the quantized phase according to a reference signal to generate a rotated quantized phase. For example, as shown in FIG. 13, each field of the delay line 1301 including a stored quantized magnitude 908 samples and quantized phase 911 sample—may be provided as an input to a phase rotation module 1302. Additionally, the phase rotation module 1302 may receive a reference signal 1303. The reference signal 1303 may determine an amount of phase rotation applied to each quantized phase 911. The phase rotation module 1302 may apply a phase rotation to the quantized phase 911 according to the reference signal 1303 to produce a rotated quantized phase 911'. In a case where the reference signal 1303 contains only phase information, the phase rotation may serve as a multiplier for each quantized phase 911. As the signals are in polar form (e.g. quantized magnitude 908 and rotated quantized phase 911') as opposed to rectangular form, the phase can be manipulated by addition (i.e. phase rotation) rather than complex multiplication. The class of phase-only reference signals includes phase shift keying (PSK), minimum shift keying (MSK), and other phase modulation schemes.

Figure 14:
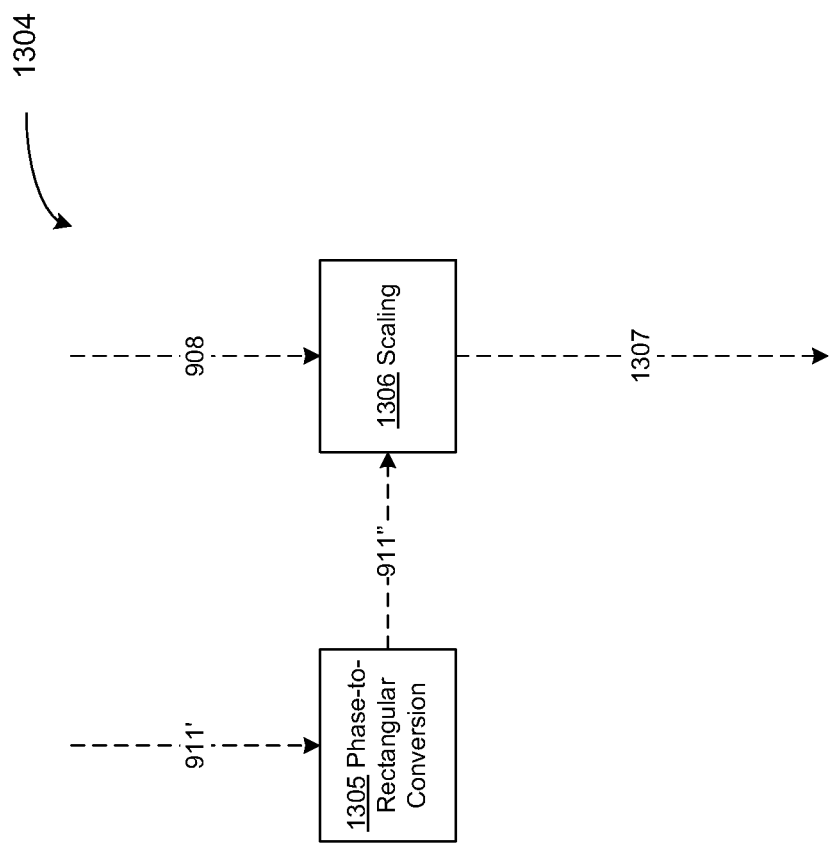

Operation 830 illustrates converting at least one of the quantized magnitude and the rotated quantized phase to component real and imaginary parts. For example, as shown in FIG. 13, each quantized magnitude 908 and rotated quantized phase 911' may be provided to a polar-to-rectangular conversion module 1304. Each quantized magnitude 908 and rotated quantized phase 911' may be converted into real and imaginary components by the polar-to-rectangular conversion module 1304. For example, as shown in FIG. 14, a phase-to-rectangular conversion module 1305 may receive the rotated quantized phase 911'. The polar-to-rectangular conversion module 1304 may produce the real and imaginary parts of the quantized magnitude 908 and rotated quantized phase 911' as a unit-vector (or constant magnitude vector) with the phase of that unit-vector approximating the rotated quantized phase 911'. This may be achieved efficiently using a look-up table. A converted rotated quantized phase 911" and the quantized magnitude 908 may be provided to a scaling module 1306 to adjust the relative magnitude of the unit vector depending on the quantized magnitude 908 to produce a combined quantized complex signal 1307.

Operation 840 illustrates computing a sum of component real and imaginary parts of the at least one of the quantized magnitude and the rotated quantized phase via complex addition. For example, as shown in FIG. 13, a complex addition module 1308 may receive the quantized complex signals 1307 from the polar-to-rectangular conversion module 1304 and compute a complex sum 1309 of those real and imaginary components.

Operation 850 illustrates comparing the sum to a correlation threshold. For example, as shown in FIG. 13, a correlation comparator module 1310 may receive the complex sum 1309 and compare it to a correlation threshold 1311. The correlation threshold 1311 may be predetermined and may be a result of a compromise between false alarm probability and the probability of successfully detecting a desired signal. If the complex sum 1309 is greater than the correlation threshold 1311, the signal correlation system 1300 may determine that the high-resolution complex signal 902 is a proper signal and forward either the high-resolution complex signal 902, or the quantized magnitude 908 and quantized phase 911 on to additional system resources for additional processing.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware modules, software modules, and/or firmware modules), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components configured and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A method for signal quantization comprising:
receiving a complex signal characterized by a real portion and an imaginary portion;

computing a vector magnitude of a sample of the complex signal;
computing a quantization threshold value from at least one weighted sample of the complex signal;
comparing the vector magnitude of the sample to the quantization threshold value;
associating a quantized magnitude with the sample according to a comparison between the vector magnitude of the sample and the quantization threshold value.

2. A method for signal quantization comprising:
receiving a complex signal characterized by a real portion and an imaginary portion;
computing a vector magnitude of a sample of the complex signal;
computing a second vector magnitude of a second sample of the complex signal;
computing a third vector magnitude of a third sample of the complex signal; and
computing a quantization threshold value from at least the vector magnitude, the second vector magnitude and the third vector magnitude;
comparing the vector magnitude of the sample to the quantization threshold value; and
associating a quantized magnitude with the sample according to a comparison between the vector magnitude of the sample and the quantization threshold value.

3. The method of claim 2, wherein the computing a quantization threshold value from at least the vector magnitude, the second vector magnitude and the third vector magnitude further comprises:
computing an average of at least the vector magnitude, the second vector magnitude, and the third vector magnitude.

4. The method of claim 3, wherein the computing an average of at least the vector magnitude, the second vector magnitude, and the third vector magnitude comprises:
computing a weighted average of at least the vector magnitude, the second vector magnitude, and the third vector magnitude.

5. A method for signal quantization comprising:
receiving a complex signal characterized by a real portion and an imaginary portion;
computing a vector magnitude of a sample of the complex signal;
computing a quantization threshold value;
comparing the vector magnitude of the sample to the quantization threshold value; and
associating a quantized magnitude with the sample according to a number of standard deviations that the vector magnitude is above or below the quantization threshold value.

6. A method for signal quantization comprising:
receiving a complex signal characterized by a real portion and an imaginary portion;
computing a vector magnitude of a sample of the complex signal;
computing a quantization threshold value;
comparing the vector magnitude of the sample to the quantization threshold value;
associating a quantized magnitude with the sample according to a comparison between the vector magnitude of the sample and the quantization threshold value;
associating a quantized phase with the sample;
storing at least one of the quantized magnitude and the quantized phase in at least one field of a delay line; and
applying at least one phase rotation to the quantized phase according to a reference signal to generate a rotated quantized phase.

7. The method of claim 6, further comprising:
converting at least one of the quantized magnitude and the rotated quantized phase to component real and imaginary parts.

8. The method of claim 7, further comprising:
computing a sum of the component real and imaginary parts of the at least one of the quantized magnitude and the rotated quantized phase via complex addition.

9. The method of claim 8, further comprising:
comparing the sum to a correlation threshold.

10. A system comprising:
means for receiving a complex signal characterized by a real portion and an imaginary portion;
means for computing a vector magnitude of a sample of the complex signal;
means for computing a quantization threshold value from at least one weighted sample of the complex signal;
means for comparing the vector magnitude of the sample to the quantization threshold value; and
means for associating a quantized magnitude with the sample according to a comparison between the vector magnitude of the sample and the quantization threshold value.

11. A system comprising:
means for receiving a complex signal characterized by a real portion and an imaginary portion;
means for computing a vector magnitude of a sample of the complex signal;
means for computing a second vector magnitude of a second sample of the complex signal;
means for computing a third vector magnitude of a third sample of the complex signal;
means for computing a quantization threshold value from at least the vector magnitude, the second vector magnitude and the third vector magnitude;
means for comparing the vector magnitude of the sample to the quantization
means for associating a quantized magnitude with the sample according to a comparison between the vector magnitude of the sample and the quantization threshold value.

12. A system comprising:
means for receiving a complex signal characterized by a real portion and an imaginary portion;
means for computing a vector magnitude of a sample of the complex signal;
means for computing a quantization threshold value;
means for comparing the vector magnitude of the sample to the quantization threshold value;
means for associating a quantized magnitude with the sample according to a comparison between the vector magnitude of the sample and the quantization threshold value;
means for associating a quantized phase with the sample;
means for storing at least one of the quantized magnitude and the quantized phase in at least one field of a delay line; and
means for applying at least one phase rotation to the quantized phase according to a reference signal to generate a rotated quantized phase.

13. The system of claim 12, further comprising:
means for converting at least one of the quantized magnitude and the rotated quantized phase to component real and imaginary parts.

14. The system of claim 13, further comprising:
means for computing a sum of the component real and imaginary parts of the at least one of the quantized magnitude and the rotated quantized phase via complex addition.

15. The method of claim 14, further comprising:
means for comparing the sum to a correlation threshold.

* * * * *